United States Patent
Jabalee

Patent Number: 5,820,201
Date of Patent: Oct. 13, 1998

[54] HIGH IMPACT BARRIER FOR AUTOMOBILE BODY EXTERIOR COMPONENTS

[76] Inventor: Walter J. Jabalee, 42077 Toddmark La., Clinton Township, Mich. 48038

[21] Appl. No.: 742,117

[22] Filed: Oct. 31, 1996

[51] Int. Cl.⁶ .............. B62D 25/00; B60J 11/00
[52] U.S. Cl. ............ 296/136; 296/95.1; 296/901; 160/370.21; 150/166; 280/770
[58] Field of Search ............... 296/136, 95.1, 296/901; 150/166, 168; 160/370.21; 280/762, 770, 849

[56] References Cited

U.S. PATENT DOCUMENTS

| | | |
|---|---|---|
| 2,048,461 | 7/1936 | Mosgofian . |
| 2,119,072 | 5/1938 | Cohen . |
| 3,563,594 | 2/1971 | London . |
| 3,836,192 | 9/1974 | Wilfert . |
| 3,910,330 | 10/1975 | Johnson et al. . |
| 4,041,999 | 8/1977 | Miller . |
| 4,061,805 | 12/1977 | Thompson et al. ............ 428/31 |
| 4,378,395 | 3/1983 | Asoshina et al. . |
| 4,399,174 | 8/1983 | Tanaka et al. . |
| 4,444,818 | 4/1984 | Tominaga et al. . |
| 4,531,560 | 7/1985 | Balanky . |
| 4,589,459 | 5/1986 | Lantrip . |
| 4,635,996 | 1/1987 | Hirose . |
| 4,734,312 | 3/1988 | Sugiyama .................. 150/166 X |
| 4,811,982 | 3/1989 | Carlyle ........................ 296/95.1 |
| 4,884,824 | 12/1989 | Radke . |
| 5,002,326 | 3/1991 | Westfield et al. . |
| 5,044,688 | 9/1991 | Jacobson ....................... 296/136 |
| 5,158,324 | 10/1992 | Flesher ...................... 296/136 X |
| 5,211,438 | 5/1993 | Snow ......................... 296/136 X |
| 5,280,989 | 1/1994 | Castillo ......................... 296/136 |
| 5,618,073 | 4/1997 | Criscione .................. 296/136 X |

Primary Examiner—Joseph D. Pape
Attorney, Agent, or Firm—John R. Benefiel

[57] ABSTRACT

A high impact barrier for the exterior components of an automobile body to enable lightweight automobiles to better withstand collisions and provide a protective enclosure of the passenger compartment, accomplished by bonding pre-cut sheets of heavy gauge SUNPRENE™ polyprene onto the outer surfaces of the body panels. Clear sheets of polyprene are also bonded to the interior and exterior windshield and rear glass surfaces, and to the outer surfaces of bumpers and headlight lenses.

26 Claims, 3 Drawing Sheets

HIGH IMPACT BARRIER FOR AUTOMOBILE BODY EXTERIOR COMPONENTS

BACKGROUND OF THE INVENTION

The present invention concerns the construction of automobile bodies, and more particularly exterior components such as body panels, doors, windshields, rear windows, bumpers, and headlights.

The present day emphasis on fuel economy has resulted in a very substantial reduction in the thickness of the sheet metal used in the construction of car bodies, and the full box frame is no longer used in passenger cars.

This in turn has dramatically increased the danger to occupants when an automobile is involved in a moderately severe collision in that the metal is much more likely to be torn to produce jagged-edged exposed metal fragments and overall gross distortion of the car body.

The reduced strength of the body creates greater fragmentation of other frangible components such as the windshield and rear glass. Traditional safety glass and tempered glass construction no longer provides sufficient protection from fractured glazing panels.

The reduced integrity of the body also allows crushing and penetration of the passenger compartment to a greater degree than when heavier body panels and frame construction were the norm in auto design and construction.

There have been various efforts heretofore proposed to stiffen body panels and to protect the exterior surfaces from minor damage.

U.S. Pat. No. 3,836,192 issued on Sep. 17, 1974 for a "Body for Vehicles and Especially Passenger Motor Vehicles" describes a thick layer of a resinous plastic to the exterior body section subject to collision damage. The end result is not an overall reinforcement of body integrity. Also, such reinforcement cannot easily be applied as an aftermarket item and does not provide increased strength to the glazing panels and other components.

U.S. Pat. No. 4,378,395 issued on Mar. 29, 1983 for a "Reinforcing Material" and U.S. Pat. No. 4,399,174 issued on Aug. 16, 1983 for a "Reinforcing Material" describe a stiffening of body panels with resin layers on the inside of a body panel.

While stiffening the panel, the resistance to tearing of the metal is not substantially improved, nor to penetration of the passenger compartment. Also, the exterior surfaces are not protected from minor cosmetic damage.

U.S. Pat. No. 4,635,996 issued on Jan. 13, 1987 for a "Vehicle Body Cover" describes an aftermarket applied covering sheet which serves to protect the surface finish, but which is not sufficiently strong to reduce appreciably the tearing and penetration of the auto body during a severe collision.

U.S. Pat. No. 5,002,326 issued on Mar. 26, 1991 for an "Automobile Windshield Laminated Protector" describes the application of adhesive backed multilayer sheet polycarbonate resin to the outside of a windshield. Again, while reducing the incidence of minor damage to the windshield, fragmentation and the launching of sharp-edged shards of glass during a severe collision is not avoided by this approach.

The object of the present invention is to provide a high impact barrier for the exterior components of an automobile body sufficient to create a substantially improved resistance to tearing and fragmentation and passenger compartment penetration caused by collisions.

It is a further object of the invention to provide such barrier which can be applied as an aftermarket item and which also protects the exterior surface against minor damage.

SUMMARY OF THE INVENTION

These and other objects of the present invention, which will be understood upon a reading of the following specification and claims, are achieved by substantially enclosing the passenger compartment of an automobile by installing a high impact barrier structure over each of the body components to create a much strengthened body structure. This barrier structure can be created by adhesively bonding precut heavy gauge sheets of a particularly tough, rubbery PVC plastic, preferably a polyprene marketed under the tradename "SUNPRENE". This material may be provided in fully weather able colors, clear, and metallics, and in matte or high gloss surface finishes so as to provide a fully satisfactory appearance.

The barrier sheets are preferably of 200–250 millimeter thickness such as to convert a lightweight sheet steel automobile body into a greatly strengthened structure, resistant to tearing failure of the panels and penetration of the passenger compartment.

The sheets can be configured to overlap seams such as along the hinged side of a door to provide further strength.

Sheets of clear, optical grades of polyprene are adhesively fastened to the inside and outside of both the windshield and rear glass to provide a similar barrier for the vehicle glass preventing penetration by flying objects.

The sheets can be provided in kits for aftermarket application, with individual panels precut into patterns computer generated to be fit to door panels, hoods, fenders, etc.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, sheets of a tough, rubber-like plastic material are adhesively bonded to the outer surfaces of the various exterior components of an automobile. This material is a type of polyprene (EDPM Ethylene Polychoroprene-Diene Modomer Rubber) which is a PVC based high molecular weight resin elastomer which can be extruded into sheet form and resembles rubber, but is a true thermoplastic. SUNPRENE™ (F8000) is polyprene marketed by Perma-Chem, Inc., and is preferred for practice of the present invention.

This material is tough and flexible, and indeed is almost indestructible. It has superior heat aging, flexing fatigue strength, abrasion resistance, weatherability, chemical resistance, cold impact resistance, and ozone resistance. It is also lightweight and has a high coefficient of thermal stability, and can be made in colors and surface finishes suitable for exterior auto styling.

Sheets of SUNPRENE™ (F8000) of heavy gauge are used, of a thickness preferably on the order of 200–250 millimeters thickness, precut into pattern blanks which are configured so as to be able to be shaped to the outer surface of each component at installation to be coextensive therewith.

At substantial thicknesses of 40 millimeters or greater, the high impact barrier sheets have greater resistance to impact tearing than the sheet steel forming modern body panels.

Precut clear sheets of SUNPRENE™ are also bonded to the inside and outside of the windshield and rear window surfaces to eliminate fragmentation in crashes. The outer surfaces of headlights and bumpers may also be covered with clear SUNPRENE™ sheets to protect the same from breakage in the case of headlights and marring in the case of bumpers.

The precut sheets can also be configured to overlap the gaps occurring where the hinged side of the door meets the front fender to provide additional strength.

The auto body having the high impact barrier will offer considerably reduced tendency for tearing and fragmentation of the metal panel sections in severe collisions, and also much improved resistance to penetration of the passenger compartment.

Figure 1:
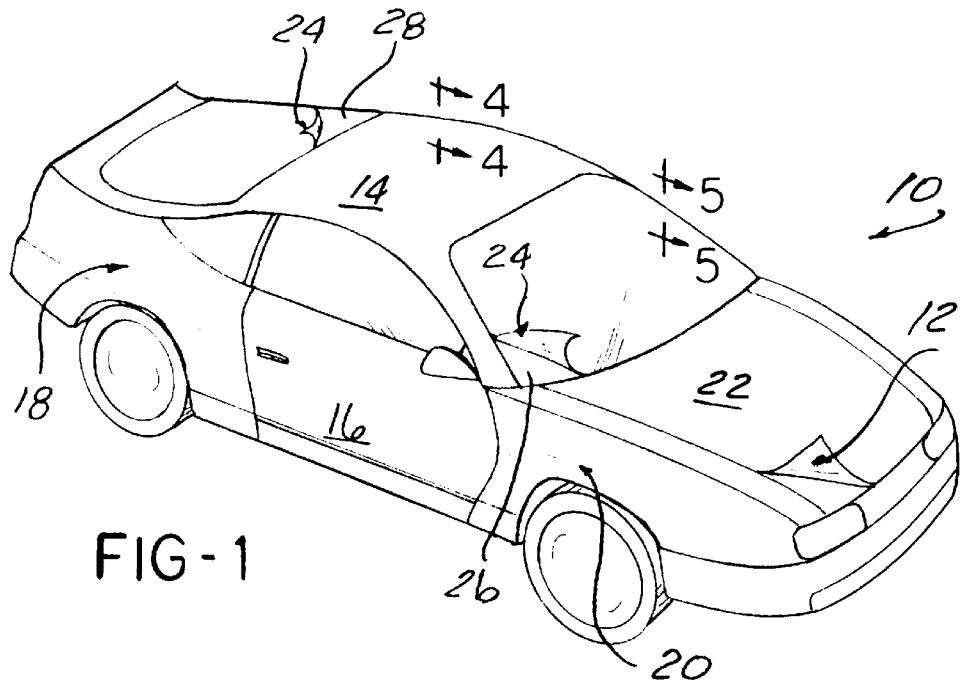
FIG. 1 is a perspective view of an automobile having the reinforcement according to the invention applied thereto.

FIG. 1 illustrates an automobile 10 having exterior components covered so as to form an enclosing barrier for the passenger compartment, according to the concept of the present invention. All metal panels have a heavy gauge sheet 12 of SUNPRENE™ adhesively bonded thereto to be permanently attached.

These include roof panel 14, door panel 16, quarter panels 18, front fenders 20, and hood 22.

Figure 2:
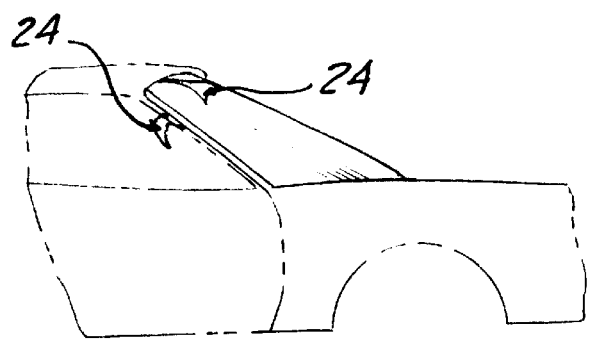
FIG. 2 is a side elevational fragmentary view of an automobile showing partially peeled back clear reinforcing sheets for both the inside and outside of the windshield.

In addition, clear heavy gauge sheets 24 of SUNPRENE™ are bonded to the outer surfaces of the windshield 26 and rear window glass 28, as well as to the inside surfaces as indicated in FIG. 2. Such sheets create a barrier protecting the windshield and rear glass from penetration, as from heavy objects dropped from overpasses. This barrier will prevent shattering and penetration even by relatively heavy objects such as cinder blocks, pieces of concrete, etc. The vehicle occupants are thus much more secure from such acts of vandalism.

The SUNPRENE™ sheets 12 and 24 are preferably precut into blanks as by computer controlled laser beam devices correspondingly configured to an outer surface of a respective body component exterior.

Each body panel, windshield, etch for each car model requires a correspondingly designed sheet configuration to enable molding individual sheet pieces to its corresponding body part outer surface.

This could be accomplished by precoating one side of four-by-eight sheets of SUNPRENE™ with a suitable adhesive such as Superbonder™ 430, 493, 495, or Speedbonder™ 312, 324, or 325 available from the Loctite Company. UV cured formulations are preferred for clear sheets 24.

An adhesive curtain of weakly adhering treated paper is laid over the adhesive coated side of the four-by-eight sheets prior to laser cutting of the individual pieces. The body parts are coated with the proper primer/activator and the curtain covering peeled off the sheets 16, 24, which are then pressed onto the body part surface.

Figure 3:
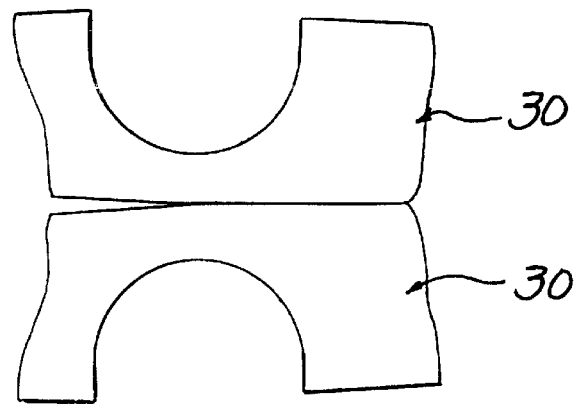
FIG. 3 is a plan view of two reinforcing sheets precut and joined together for use in an aftermarket kit.
Figure 4:
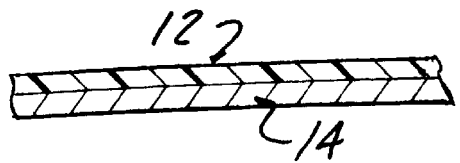
FIG. 4 is a view of the section labelled 4—4 in FIG. 1.
Figure 5:
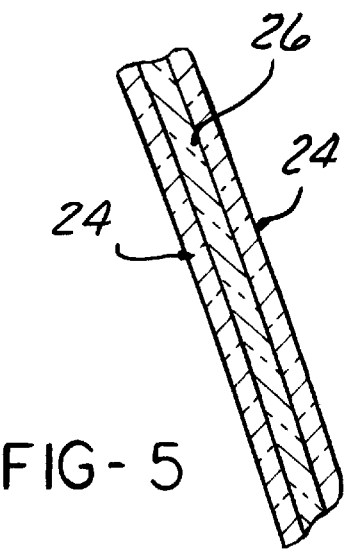
FIG. 5 is a view of both sections labelled 5—5 in FIG. 1.

This may be done as an aftermarket procedure with kits containing some of the body part reinforcing pieces 30 attached along one side, as shown in FIG. 3. This could also provide for repair of damaged body panels by covering holes, small dents, etc.

Figure 6:
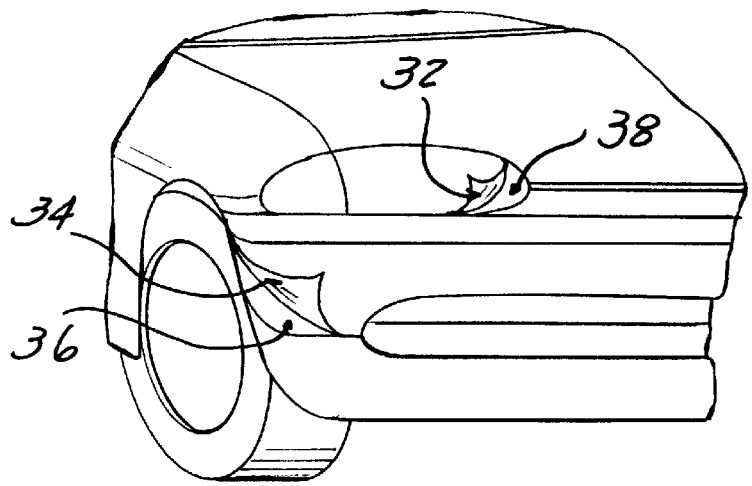
FIG. 6 is a fragmentary perspective view of the front of an automobile having clear reinforcing sheets applied to the surface of headlight lens and bumper, shown partially peeled back for clarity.

As indicated in FIG. 6, thin gauge (i.e., 40 millimeters) clear sheets 32 of SUNPRENE™ can be applied to the bumper 36 and headlights 38 to reduce the incidence of marring and breakage.

Figure 7:
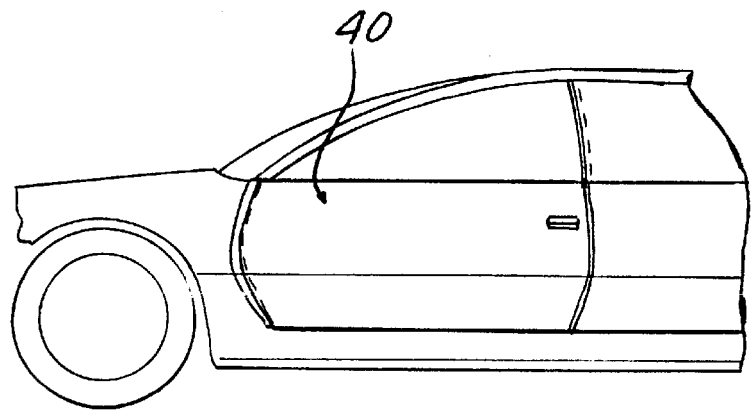
FIG. 7 is a fragmentary side elevational view of an automobile having reinforcing sheets applied to a door panel so as to overlap the clearance gap along the hinged side of the door.

FIG. 7 shows a barrier sheet 40 bonded to a door panel which is configured to extend over the front hinged edge of the door panel, overlapping the gap which occurs at that point. The superior flexing ability of SUNPRENE™ allows the door to be opened, with the gap bridged to provide additional reinforcement.

The barrier structure created by the above-described installation encloses the passenger compartment and greatly strengthens the vehicle body.

As a further development, very heavy gauge sheets in excess of 250 millimeters can be applied to tanker trucks as a structural strengthening of the tank, and to protect against penetration of the tank. This could also be done with other heavy vehicles such as off-road heavy equipment, quarry trucks, etc. so as to provide better protection against damage and injury from impact with boulders, etc.

FIGS. 8A–8F show the preferred steps of installation of a barrier sheet, as on the windshield. Installation of large panels would likely be done by aftermarket services, such as auto glass shops, etc.

The sheet 42 has weakly adhering backing paper split on one side at 44.

Figure 8A:
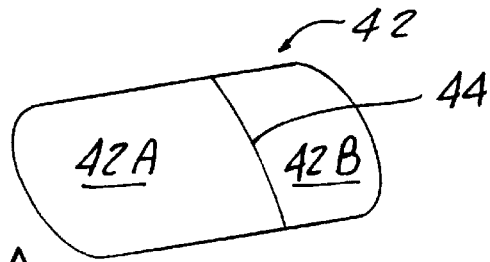
FIGS. 8A–8F are diagrammatic views illustrating the preferred method of installing the barrier sheets.
Figure 8B:
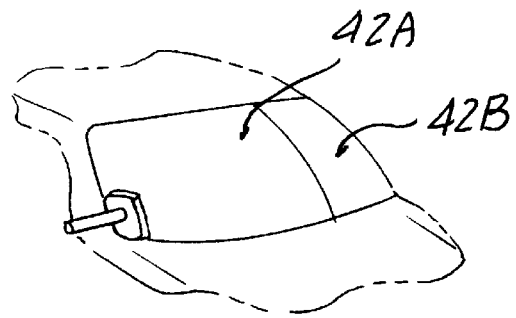
Figure 8C:
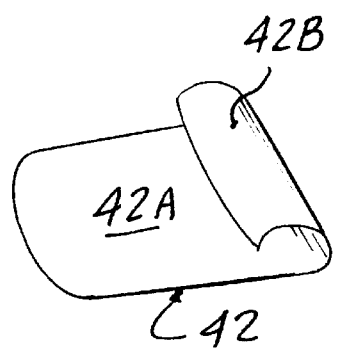
Figure 8D:
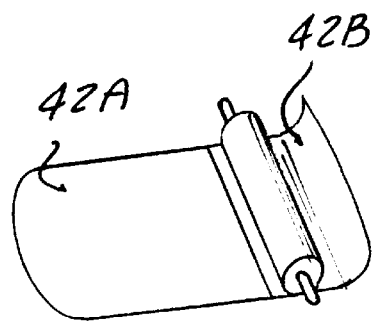
Figure 8E:
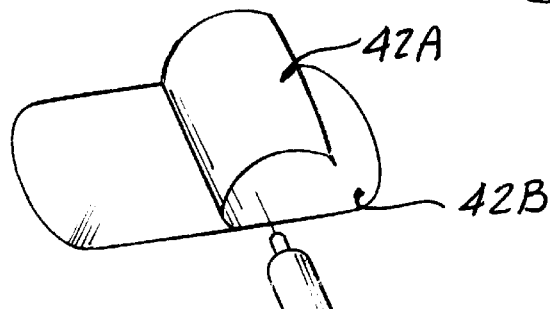
Figure 8F:
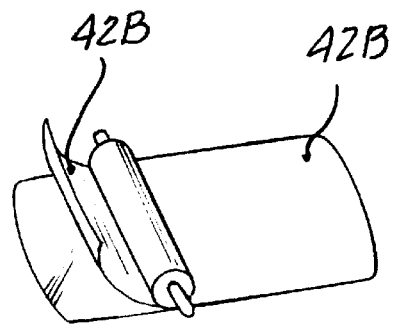

The left side of the sheet 42A is positioned and held against the windshield on the left side, as shown in FIG. 8B. The right side 42B is curled up and the backing paper removed (FIG. 8C) and then the right side 42B rolled up to remove air bubbles (FIG. 8D).

The left side is then curled back, the backing paper removed, and then rolled out to complete the installation.

I claim:

1. A method of protecting one or more vehicle body components, comprising the steps of:

cutting one or more sheets of heavy gauge polyprene plastic into one or more patterns correspondingly configured to coextensively overlie an outer surface of one or more exterior body components;

applying each of said one or more sheets to a respective exterior body component in a position so as to overlie and be coextensive with said outer surface of said respective component; and, permanently bonding said one or more heavy gauge polyprene sheets to said outer surface in said position thereon, providing a high impact barrier for said one or more vehicle body components.

2. The method according to claim 1 wherein in said cutting step, sheets of a thickness of 40 millimeters or greater ranging from 40–250 millimeters of polyprene are cut into said one or more patterns.

3. The method according to claim 2 wherein in said cutting steps SUNPRENE™ polyprene sheets are cut into said one or more patterns.

4. The method according to claim 2 further including the steps of cutting a correspondingly configured sheet of polyprene for said outer surface of each body panel comprising said vehicle body components into said correspondingly configured pattern to be fit to the outer surface thereof, and each of said sheets is applied to a corresponding body panel outer surface to be coextensive therewith and bonded thereto in said position, whereby a vehicle passenger space within said body panels is enclosed in a protective barrier.

5. The method according to claim 2 wherein a sheet of clear polyprene is cut into a pattern corresponding to a windshield outer surface comprising an exterior body component, and said clear polyprene sheet is permanently bonded to an outer surface of said windshield and bonded thereto.

6. The method according to claim 5 further including the step of cutting a sheet of clear polyprene into a pattern corresponding to the inner surface of said windshield and wherein said sheet is applied to said inner surface and bonded thereto.

7. The method according to claim 6 further including the steps of cutting a polyprene sheet into a pattern to correspond to the outer surface of a rear window glass of said vehicle, and including the steps of applying said clear sheet to said rear window glass outer surface in a position to be coextensive therewith, and bonding the same thereto in said position.

8. The method according to claim 6 further including the step of cutting a clear polyprene sheet into a pattern correspondingly configured to an inside surface of said rear window glass, applying said sheet to said rear window glass inner surface in a position to be coextensive therewith, and bonding the same thereto in said position.

9. The method according to claim 1 wherein in said cutting step, a clear polyprene sheet is cut into a pattern correspondingly configured to an outer surface of a bumper comprising a vehicle body component, and further including the steps of applying said clear polyprene sheet to said bumper outer surface in a position to be coextensive therewith and bonding the same thereto in said position.

10. The method according to claim 1 further including the steps of cutting a sheet of clear polyprene plastic into a pattern having a configuration corresponding to an outer surface of a light lens comprising a vehicle body component, and further including the steps of applying said clear sheet to said outer surface of said light lens in a position to be coextensive therewith and bonding the same thereto in said position.

11. The method according to claim 1 including the further step of cutting a sheet into a configuration corresponding to the outer surface of a door panel comprising a vehicle body component, but with a portion thereof extending beyond the perimeter of said door panel along a hinged edge and wherein said sheet is applied to said door panel outer surface with said edge projecting beyond a hinging edge of said door panel and bonding the sheet thereto in said position.

12. The method according to claim 1 wherein in said cutting steps said polyprene sheets are of 200 millimeter or greater thickness.

13. The method according to claim 1 wherein said polyprene sheets comprises SUNPRENE™ F8000.

14. A high impact barrier for a vehicle body comprising:
one or more sheets of heavy gauge polyprene plastic cut into patterns correspondingly configured to coextensively overlie an outer surface of one or more exterior body components of said vehicle;
each of said one or more sheets applied to a respective exterior body component in a position so as to overlie and be coextensive with said outer surface of said respective component;
said one or more heavy gauge polyprene sheets permanently bonded to said outer surface in said coextensive position thereon.

15. The high impact barrier according to claim 14 wherein said polyprene sheets are of a thickness of 40 millimeters or greater.

16. The high impact barrier according to claim 15 wherein said polyprene sheets are comprised of SUNPRENE™.

17. The high impact barrier according to claim 15 further including a correspondingly configured sheet of polyprene for said outer surface of each body panel of said vehicle body components, applied to a corresponding body panel outer surface to be coextensive therewith and bonded thereto in said position so as to enclose a passenger compartment with said high impact barrier.

18. The high impact barrier according to claim 15 wherein a sheet of clear polyprene in a pattern corresponding to an outer surface of a windshield included in said vehicle body components and said clear polyprene sheet is applied to an outer surface of said windshield and bonded thereto.

19. The high impact barrier according to claim 18 further including a sheet of clear polyprene in a position to be coextensive therewith in a pattern corresponding to an inner surface of said windshield, said sheet applied to said inner surface in a coextensive position, and bonded thereto in said position.

20. The high impact barrier according to claim 19 further including polyprene sheets correspondingly configured to an outer surface of a rear window glass comprising a vehicle body component, said clear sheet to be applied to said rear window glass outer surface in a position to be coextensive therewith, and bonded thereto in said position.

21. The high impact barrier according to claim 19 further including a clear polyprene sheet in a pattern correspondingly configured to an inside surface of said rear window glass, said sheet applied to said rear window glass inner surface in a position to be coextensive therewith, and bonded thereto in said position.

22. The high impact barrier according to claim 14 further including a clear polyprene sheet, a pattern correspondingly configured to an outer surface of a bumper comprising a vehicle body component and applied to said bumper outer surface in a position to be coextensive therewith and bonded thereto in said position.

23. The high impact barrier according to claim 14 further including a sheet of clear polyprene plastic in a pattern corresponding to an outer surface of a light lens comprising a vehicle body component, said clear sheet applied to said outer surface of said light lens outer surface in a position to be coextensive therewith and bonded thereto in said position.

24. The high impact barrier according to claim 14 further including one or more sheets in a configuration corresponding to outer surface of a door panel comprising a vehicle body component, but with a portion thereof extending beyond a perimeter of said door panel along a hinged edge and wherein said sheet is applied to said door panel outer surface in a position with said edge projecting beyond a hinging edge of said door panel and bonded thereto in said position.

25. The high impact barrier according to claim 14 wherein said one or more polyprene sheets are on the order of 200 millimeters or greater thickness.

26. The high impact barrier according to claim 14 wherein said polyprene sheets are comprised of SUNPRENE™ F8000.

* * * * *

UNITED STATES PATENT AND TRADEMARK OFFICE
CERTIFICATE OF CORRECTION

PATENT NO. : 5,820,201
DATED : October 13, 1998
INVENTOR(S) : Walter J. Jabalee

It is certified that error appears in the above-indentified patent and that said Letters Patent is hereby corrected as shown below:

Column 4, line 62, delete "millimeters" and insert therefor --mils--. (Patent Office error).

Column 4, line 63, delete "millimeters" and insert therefor --mils--. (Patent Office error).

Column 6, line 62, delete "millimeters" and insert therefor --mils--. (Patent Office error).

Signed and Sealed this

Eighth Day of June, 1999

*Attest:*

Q. TODD DICKINSON

*Attesting Officer*      *Acting Commissioner of Patents and Trademarks*